US011058069B2

(12) United States Patent
Lempidakis et al.

(10) Patent No.: US 11,058,069 B2
(45) Date of Patent: *Jul. 13, 2021

(54) MULTILAYER PLASTIC FILM WITH SEPARABLE LAYERS FOR COVERING OF INFLATED GREENHOUSE

(71) Applicant: Plastika Kritis S.A., Iraklion (GR)

(72) Inventors: Ioannis Lempidakis, Iraklion (GR); Emmanouil Lempidakis, Iraklion (GR); Michail Lempidakis, Iraklion (GR)

(73) Assignee: Plastika Kritis S.A., Iraklion (GR)

( * ) Notice: Subject to any disclaimer, the term of this patent is extended or adjusted under 35 U.S.C. 154(b) by 140 days.

This patent is subject to a terminal disclaimer.

(21) Appl. No.: 15/782,774

(22) Filed: Oct. 12, 2017

(65) Prior Publication Data

US 2018/0027754 A1    Feb. 1, 2018

Related U.S. Application Data

(63) Continuation of application No. 13/452,473, filed on Apr. 20, 2012, now Pat. No. 9,820,448.

(30) Foreign Application Priority Data

Apr. 20, 2011 (GB) ..................................... 1106677

(51) Int. Cl.
| *A01G 9/14* | (2006.01) |
| *B32B 7/06* | (2019.01) |
| *B32B 27/08* | (2006.01) |
| *B32B 27/30* | (2006.01) |
| *B32B 27/32* | (2006.01) |
| *B32B 27/34* | (2006.01) |
| *B32B 33/00* | (2006.01) |
| *B32B 43/00* | (2006.01) |
| *A01G 13/02* | (2006.01) |
| *B32B 37/15* | (2006.01) |

(52) U.S. Cl.
CPC .......... *A01G 9/1438* (2013.01); *A01G 9/1415* (2013.01); *A01G 13/02* (2013.01); *B32B 7/06* (2013.01); *B32B 27/08* (2013.01); *B32B 27/306* (2013.01); *B32B 27/308* (2013.01); *B32B 27/32* (2013.01); *B32B 27/34* (2013.01); *B32B 33/00* (2013.01); *B32B 43/006* (2013.01); *B32B 37/153* (2013.01); *B32B 2307/412* (2013.01); *B32B 2307/5825* (2013.01); *B32B 2307/71* (2013.01); *B32B 2307/748* (2013.01); *B32B 2410/00* (2013.01); *Y02A 40/25* (2018.01); *Y10T 428/24967* (2015.01); *Y10T 428/31725* (2015.04); *Y10T 428/31855* (2015.04)

(58) Field of Classification Search
CPC .. A01G 9/1415; A01G 9/1407; A01G 9/1438; A01G 9/1469; A01G 13/00; A01G 13/02; A01G 13/0275; C09J 7/29; C09J 2201/16; C09J 2201/162; B32B 37/14; B32B 37/144; B32B 43/006

USPC ........... 47/17, 20.1, 29.1, 29.4, 31, 31.1, 32, 47/32.1; 428/411.1, 423.1, 423.5, 474.4

See application file for complete search history.

(56) References Cited

U.S. PATENT DOCUMENTS

| 4,952,443 | A | 8/1990 | Gravisse |
| 5,585,418 | A | 12/1996 | Nagata |
| 5,678,353 | A | 10/1997 | Tsao et al. |
| 5,763,047 | A | 6/1998 | Green |
| 7,027,962 | B2 | 4/2006 | Hayo et al. |
| 7,037,962 | B2 | 5/2006 | Destro et al. |
| 8,024,891 | B2 * | 9/2011 | Maria Ruiter ......... A01G 9/222 47/17 |
| 2007/0184274 | A1 | 8/2007 | Wheatley et al. |
| 2009/0133340 | A1 | 5/2009 | Shiao |
| 2010/0058656 | A1 | 3/2010 | Chevalier et al. |
| 2012/0159880 | A1 * | 6/2012 | Veilleux ............... C03C 27/048 52/204.62 |
| 2013/0097922 | A1 | 4/2013 | Lempidakis et al. |

FOREIGN PATENT DOCUMENTS

| EP | 0322199 | 6/1989 |
| EP | 1213318 | 6/2002 |
| EP | 1494858 | 1/2005 |
| EP | 1857272 | 11/2007 |
| EP | 2514301 | 10/2012 |
| GB | 2254044 | 9/1992 |
| JP | 2004/141017 | 5/2004 |
| JP | 2014/505575 | 3/2014 |
| WO | 1994/029104 | 4/1996 |

(Continued)

OTHER PUBLICATIONS

H. G. J. Snell et al., "Effects of the colour and thickness of polyethylene film on ensiling conditions and silage quality of chopped maize, as investigated under ambient conditions and in mini-silos," Abstract only (Year: 2002).*

(Continued)

*Primary Examiner* — Lisa L Tsang

(74) *Attorney, Agent, or Firm* — Stoel Rives LLP; Jordan B. Olsen

(57) ABSTRACT

A multilayered polymeric film for covering an agricultural structure or greenhouse is described herein, wherein the film contains adjacent layers that are capable of delamination from one another. A method of covering an agricultural structure or greenhouse with the multilayered polymeric film can comprise inserting gas between adjacent layers of the film.

30 Claims, No Drawings

(56) References Cited

FOREIGN PATENT DOCUMENTS

| WO | 1996/011108 | 4/1996 |
|---|---|---|
| WO | 1997/000006 | 1/1997 |
| WO | 1998/025760 | 6/1998 |
| WO | 2009/060480 | 5/2009 |
| WO | 2011/057752 | 5/2011 |
| WO | 2012/143289 | 10/2012 |

OTHER PUBLICATIONS

International Search Report and Written Opinion dated Sep. 5, 2012 in International Application No. PCT/EP2012/056717.
International Preliminary Report on Patentability and Written Opinion dated Oct. 22, 2013 in International Application No. PCT/EP2012/056717.
European Search Report and Written Opinion dated Sep. 5, 2012 in European Application No. EP 12153448.
EP Communication dated Oct. 29, 2012 in European Application No. 12153448.1.
Response to EP Communication filed Nov. 15, 2012 in European Application No. 12153448.1.
EP Communication dated Jun. 21, 2013 in European Application No. 12153448.1.
Response to EP Communication filed Oct. 16, 2013 in European Application No. 12153448.1.
"Clear Thermal Film: Elios," Agriplast, www.agriplast.com, 2 pages, received Jan. 20, 2014 (with English translation).
Bandera "Blown Film Coextrusion Lines for Agricultural Application and Geomembrane," Oct. 2010.
Botros "Fundamentals of the Adhesion Mechanisms at the Plexar Tie-Layer Resin/EVOH Interface," LyondellBasell Industries, Nov. 1994, pp. 1-10.
Cascone, et al., "Agronomic evaluation of an innovative covering thermic clear film," XVIII Congreso CIPA—Almeria, Agriplast, www.agriplast.com, 21 pages, Nov. 2009.
Huang, et al., "Adhesion, Permeability, and Mechanical Properties of Multilayered Blown Films Used Maleated Low-Density Polyethylene Blends as Adhesion-Promoting Layers," Polymer Journal, vol. 35, No. 12, Oct. 2003, pp. 978-984.
RKW Group, "Polydress O2 Barrier 2in1 EN" Brochure (http://www.rkw-group.com/news-media/publications-downloads.html) Last accessed: Feb. 20, 2013.
U.S. Appl. No. 13/452,473, dated Jan. 6, 2015, Office Action.
U.S. Appl. No. 13/452,473, dated Jul. 6, 2015, Office Action Response.
U.S. Appl. No. 13/452,473, dated Oct. 6, 2015, Office Action.
U.S. Appl. No. 13/452,473, dated Apr. 6, 2016, Office Action Response.
U.S. Appl. No. 13/452,473, dated Jun. 30, 2016, Office Action.
U.S. Appl. No. 13/452,473, dated Sep. 29, 2016, Office Action Response.
U.S. Appl. No. 13/452,473, dated Nov. 21, 2016, Office Action.
U.S. Appl. No. 13/452,473, dated May 4, 2017, Notice of Allowance.
U.S. Appl. No. 13/452,473, dated Aug. 3, 2017, Notice of Allowance.
Amendment and Response to the Final Office Action dated Feb. 9, 2017 for U.S. Appl. No. 13/452,473.

* cited by examiner

MULTILAYER PLASTIC FILM WITH SEPARABLE LAYERS FOR COVERING OF INFLATED GREENHOUSE

RELATED APPLICATION DATA

This application is a continuation of U.S. patent application Ser. No. 13/452,473, filed Apr. 20, 2012, which claims the benefit of United Kingdom Application No. GB1106677.6 filed Apr. 20, 2011. This application hereby incorporates by reference the U.S. and foreign priority applications enumerated herein.

FIELD

The present disclosure relates to a multilayered polymeric film or sheet having layers that are capable of delamination, suitable for use in combination with agricultural structures, such as greenhouses or agricultural tunnels, and for packaging applications. More particularly, the disclosure is directed to a polymeric film comprising at least two adjacent layers of different polymeric composition, wherein the layers do not significantly adhere to one another and are thus separable post-production. The polymeric film or sheet is co-extruded using known extrusion blown or cast techniques.

BACKGROUND

Greenhouses or other agricultural structures, such as agricultural tunnels, may be covered with flexible films comprising polymeric materials that are tailored to provide a favorable environment for the cultivation of crops and plants. The covers are employed to provide protection for the crops grown underneath from adverse weather conditions and to create a greenhouse effect by selectively filtering solar radiations.

The composition of the polymeric film is important and, in particular, should provide the film with: adequate mechanical properties, including resistance to tears, film elongation and stresses from atmospheric agents; high levels of light transmittance, especially in the region of chlorophyll photosynthesis; capacity to absorb radiation in the far infrared region of the spectrum, i.e. from 7000 to 13000 nm; and good light stability for an extended lifetime.

To obtain better thermal insulation during the night and reduce energy consumption, such greenhouses may use several separate films to create a layered structure that is subsequently inflated. For example, the greenhouses are covered with two, or rarely three, separate films which are individually installed one above the other and then air is inserted between them to keep them apart. This practice is thought to achieve better thermal insulation and also help in the case of strong winds and snow, as the air between the layers helps to keep the structure well tensioned and prevents any mechanical fatigue that would result from uncontrolled movement in the wind. The lifetime of plastic films on inflated greenhouses is also improved compared to single film uninflated greenhouses.

The covering for inflated greenhouses is achieved with two or rarely three films, exhibiting the same or different characteristics. The films are laid on the greenhouse structure and fixed with special clips or profiles, one after the other. In some geographical regions a single tube is laid on the structure and fixed. In both cases, after fixing the films or tube, air is inserted to keep the films or the two sides of the tube apart.

In practice, the installation process is not easy because the films must be unrolled and unfolded at heights of from 4 to 6 meters from the ground and on long lengths, usually from 50 to 100 meters, and then fixed at the sides of the span throughout their length. Afterwards, the same process has to be repeated for the second film and so on. If during the installation there are winds, there is a danger of the films being torn and for the installers to be injured. Due to these reasons and also due to the time it takes to install the two (or more) films, the process is rather expensive.

Using tubes also has disadvantages because the upper and lower film cannot be different, as required by best practices (e.g. a non-thermic mechanically strong upper film and a thermic film with anti-dripping characteristics on the lower one), and also because there are limitations on the width of the span (tubes are typically less than 8 meters), because greenhouse film tubes are currently made with a circumference of up to 16 meters at most.

WO97/00006 describes a greenhouse film having variable light diffusion properties. In one embodiment, the film may be combined with a separate, clear low density polyethylene film to produce a double-skin cover capable of being attached to a greenhouse structure and inflated with air.

Accordingly, there is still a need for an improved polymeric film that can be used in association with agricultural structures, such as greenhouses, agricultural tunnels, animal husbandry buildings, plant expositions etc. There is also a need for an inflatable film exhibiting excellent mechanical and optical properties that can be installed in a faster and simpler way, to a variety of shaped greenhouses.

SUMMARY

In accordance with a first aspect of the disclosure, there is provided a multilayered polymeric film for covering an agricultural structure or greenhouse, wherein the film contains (i) at least one layer comprising a polyamide and/or ethylene vinyl alcohol, and (ii) at least one further polymer layer connected thereto, wherein layer (i) and layer (ii) are capable of delamination from one another, the at least one further polymer layer (ii) comprises a polymeric material selected from the group consisting of polyethylene, polypropylene, ethylene vinyl acetate copolymer, ethylene butyl acrylate copolymer, thermoplastic polyurethane, and combinations of two or more thereof, and the film has a luminous transmittance greater than 30%. Preferably, the delamination is effected in situ, i.e., when in use with an agricultural structure or greenhouse.

The difference in chemical composition between said layers identified above, and/or their associated physical properties, means that they do not significantly adhere to one another and thus delaminate easily with the application of a relatively low amount of force to the layers, such as the application of fluid (preferably air) pressure, between the layers.

In accordance with a second aspect of the disclosure, there is provided a multilayered polymeric film for covering an agricultural structure or greenhouse, wherein the film contains (i) at least one layer comprising a polyamide and/or ethylene vinyl alcohol, and (ii) at least one further polymer layer, wherein at least 80% of layer (i) and layer (ii) are delaminated, the at least one further polymer layer (ii) comprises a polymeric material selected from the group consisting of polyethylene, polypropylene, ethylene vinyl acetate copolymer, ethylene butyl acrylate copolymer, thermoplastic polyurethane, and combinations of two or more thereof, and the film has a luminous transmittance greater than 30%. Delamination of the film allows a gas, preferably air, to be inserted between the separable layers of the polymeric film and creates a thermally efficient structure when the film is used in association with an agricultural structure, such as a greenhouse or tunnel.

In accordance with a third aspect of the disclosure, there is provided an agricultural structure or greenhouse, wherein the structure comprises a polymeric film according to the first or second aspects of the disclosure. The film in its inflated form creates a thermally insulating layer for improved thermal economy and provides a more physically robust nature to the entire structure.

In accordance with a fourth aspect of the disclosure, there is provided a method of covering an agricultural structure or greenhouse with the polymeric film according to the first aspect of the disclosure, comprising the step of inserting gas between (i) the at least one layer comprising the polyamide and/or ethylene vinyl alcohol and (ii) the at least one further polymer layer. The process is typically carried out in situ when the film is in combination with the agricultural structure and thus allows the film to be easily transported in a rolled, deflated form for erection on site.

The inventors have found that the polymeric composition of adjacent layers is important in providing a film in which specific layers do not significantly adhere to one another. They have also found that these layers may be delaminated by introducing air (at elevated pressure) between the layers that do not significantly adhere to one another and thus provide a single film product capable of being employed as an inflatable film with agricultural structures.

The film of the present disclosure is advantageous because it can be installed on a greenhouse or related agricultural structure in a single process, can be fixed in a faster and simpler way and then two or more layers can be separated by inserting air between them. This reduces the risks involved with the installation process (such as resistance to tear) and reduces the costs of production, because only a single film is required rather than two or three separate films as is currently required for inflated greenhouses. The present film also improves thermal insulation.

Another advantage is the impact on logistics, since instead of using two different types of film, for example one non-thermic for the outer film and one thermic anti-drip for the inner film as is usually done, only one film is used and can be transported much more easily.

DETAILED DESCRIPTION

Disclosed herein is a multilayered polymeric film for use in combination with agricultural structures. A large variety of structures are available for plant growth purposes including traditional frame greenhouses, geodesic frame greenhouses and tunnel greenhouses. The polymeric film described herein is particularly suited to commercial scale greenhouses. The film may be used for a portion or the whole of the greenhouse. The term greenhouse is used to mean any form of agricultural structure exposed to sunlight, within which a cultivation area is defined for the growth of crops, plants and the like or for the presentation and sale of ready plants. It is also used to define any metallic or wooden structure covered by plastic film that can be used for a variety of applications, such as a warehouse, as an animal husbandry building, as a temporary shelter for people etc.

The polymeric film according to the disclosure includes at least two adjacent layers which are composed of different polymeric materials. The difference may be chemical composition or physical attributes, preferably chemical composition. The difference in composition allows the layers to be delaminated after the film has been produced, since the layers do not significantly adhere to one another or become irreversibly bonded as a result of the production process. At least one of the aforementioned layers of the film is comprised of a polyamide and/or ethylene vinyl alcohol. In particular embodiments, the layer is comprised of a polyamide.

The terms "delamination" and "the layers do not significantly adhere" means that the layers preferably retain a unitary structure until a sufficient delaminating force is applied. Such a force is preferably achieved by blowing air (or other fluids) between the layers. Such a force may also be achieved by at least a part of the film being delaminated by hand (for example by rubbing or pulling the layers apart). Such a method is usually used to initiate the delamination, which is completed by the application of air pressure.

In applications having different end uses for the film, special tie-materials or other adhesive materials have been used when such polymer layers are present in order to ensure that sufficient adhesion is achieved. Nevertheless, even if tie-materials are not employed, it is not known in the art that an inflatable film can be made by delaminating adjacent layers that do not significantly adhere to one another.

Thus, the present inventors have found that by using (i) at least one polyamide and/or ethylene vinyl alcohol layer in conjunction with (ii) at least one further polymer layer that does not significantly adhere to it, it is possible to then easily delaminate the layered structure and produce an inflatable film as a single product with a layer of air between the aforementioned layers of the film. It is also within the scope of this disclosure to have additional layers in the film which contain tie-materials.

In a further embodiment, there is provided a polymeric film comprising three, four, five, six, seven, eight, nine, ten or more layers, in which two or more of the layers are capable of being delaminated, for example 3, 4 or 5 of the layers are capable of being delaminated. For example, the film may contain at least three layers in which it is possible to delaminate each layer and provide an inflated product sandwiching at least two layers of air. A film with two or more layers of air can result in greater thermal insulation than a film with one layer of air.

In the case of an arrangement in which three layers are delaminated, at least one of these is comprised of a polyamide and/or ethylene vinyl alcohol. Usually such a layer is the middle of the three layers and is enclosed by two other layers comprised of polymers that do not significantly adhere to it. However, it is also possible that the two outside layers are comprised of a polyamide and/or ethylene vinyl alcohol and the middle layer is comprised of a polymer that does not significantly adhere to it. In both of these cases, it is possible to delaminate the non-bonded layers to provide a film with two layers of air separating the polymer layers. Thus it is possible to produce a triple layer inflated greenhouse film for even further enhanced insulation properties. It is also possible to apply this principle to even higher numbers of layers to produce a film with three or more insulating air layers.

The layer (i) comprising the polyamide and/or ethylene vinyl alcohol preferably contains greater than 20 wt % of said polymer, preferably greater than 50 wt %, more preferably greater than 60 wt %, even more preferably greater than 75 wt %, most preferably greater than 90% thereof. Preferably the polyamide is selected from the group consisting of polyamide 6, polyamide 6/6, polyamide 6/66, polyamide 6/610, polyamide 6/6T, polyamide 6/3T, polyamide 6T, polyamide 9T, polyamide 4/6, polyamide 11, polyamide 12, polyamide 6/10, polyamide 6/69, polyamide 66/610 polyamide 6/12, polyamide 5/10, polyamide 6I, polyamide nanocomposites and combinations of two or more thereof. Other polyamides may also be suitable. Polyamides are beneficial because they do not adhere to other polymeric materials in the production process and because they absorb infrared radiation and thus enhance the thereto-insulating properties of the film. Ethylene vinyl alcohol is also beneficial for these reasons and preferably has 10 to 50% ethylene content, more preferably 28 to 48% ethylene content.

The remaining layers of the film are preferably employed to provide the film with physical robustness. Thus, in addition to the aforementioned layer (i) of a polyamide and/or ethylene vinyl alcohol, the polymeric film according to the disclosure further comprises (ii) at least one further polymer layer connected thereto. The composition of this layer is such that it is comprised of a material that does not significantly adhere to (i) the polyamide and/or ethylene vinyl alcohol layer during the production process. Layer (ii) comprises a polymeric material selected from the group consisting of polyethylene (including low density polyethylene, linear low density polyethylene and metallocene linear low density polyethylene), polypropylene, ethylene vinyl acetate copolymer, ethylene butyl acrylate copolymer, thermoplastic polyurethane and combinations of two or more thereof. Other materials suitable for greenhouse applications may also be applicable. The layer (ii) preferably contains greater than 10 wt % of said polymer or polymers, more preferably greater than 50 wt %, even more preferably greater than 75 wt %, most preferably greater than 90% thereof.

In some embodiments, a combination of polymers in layers (i) and (ii) are polyamide and polyethylene, respectively. In other embodiments, a combination of polymers in layers (i) and (ii) are polyamide and ethylene vinyl acetate copolymer, respectively. Another combination of polymers in layers (i) and (ii) are polyamide and ethylene butyl acrylate copolymer, respectively. Another combination of polymers in layers (i) and (ii) are ethylene vinyl alcohol and polyethylene, respectively. Another combination of polymers in layers (i) and (ii) are ethylene vinyl alcohol and ethylene vinyl acetate copolymer, respectively. Another combination of polymers in layers (i) and (ii) are ethylene vinyl alcohol and ethylene butyl acrylate copolymer, respectively.

In certain embodiments of the disclosure, layer (i) comprises less than 20% of the materials employed in layer (ii), preferably less than 10%, even more preferably layer (i) is substantially free of any materials employed in layer (ii). In another embodiment, layer (ii) comprises less than 20% of the materials employed in layer (i), preferably less than 10%, even more preferably layer (ii) is substantially free of any materials employed in layer (i).

The characterising feature of the film according to the present disclosure concerns the ability of specific layers to undergo delamination without significantly affecting the structural integrity of the individual layers, or there transparency to sunlight. In particular, (i) the at least one layer comprising a polyamide and/or ethylene vinyl alcohol and (ii) the at least one further polymer layer are capable of delamination from one another. In particular embodiments, the layers capable of being delaminated may have an average delamination strength of less than 450 g/15 mm, preferably less than 250 g/15 mm, more preferably less than 100 g/15 mm, even more preferably less than 75 g/15 mm, most preferably less than 30 g/15 mm. In certain embodiments disclosed herein, no interface of layer (i) with layer (ii) has a delamination strength of greater than 450 g/15 mm, preferably no more than 250 g/15 mm, more preferably no more than 100 g/15 mm, even more preferably no more than 30 g/15 mm. The delamination strength may be determined using a peeling tester (Shimadzu's trade name, EZ-TEST) T-peel test (ASTM D1876) at a speed of 100 mm/min on a test piece of 15 mm width cut from the laminate film. In certain embodiments, it may be preferable that at least 75% of the film area, more preferably 90%, has an average delamination strength as described herein.

The films of the present disclosure may have high luminous transmittance characteristics. The films of the present disclosure may have low haze characteristics, although this depends on geographical location as higher levels of haze may be desirable in certain areas of the world. Haze and luminous transmittance of the film of the present disclosure were measured following the ASTM-D1003-92 Standard Test Method for Haze and Luminous Transmittance of Transparent Plastics. This test method covers the evaluation of specific light-transmitting and wide-angle-light-scattering properties of planar sections of materials, such as essentially transparent plastic. A procedure is provided for the measurement of luminous transmittance and haze. Material having a haze value greater than 30% is considered diffusing. In this test method "haze" is defined as the cloudy or turbid aspect or appearance of an otherwise transparent specimen caused by light scattering from within the specimen or from its surfaces. It is measured as the percent of total transmitted light which, in passing through the specimen, deviates from the incident beam through forward scatter by more than 0.044 rad (2.5°) on the average. Luminous transmittance is the ratio of the luminous flux transmitted by a body to the flux incident upon it.

The haze measurements were made by a hazemeter. The luminous transmittance was obtained by placing a clear specimen at a distance from the entrance port of the integrating sphere.

The film of the present disclosure has a luminous transmittance greater than 30%, preferably greater than 50%, preferably greater than 75%, preferably greater than 85%.

The film of the present disclosure may exhibit a variable haze that depends on the individual application, for example from 10 to 90%.

The total thickness or gauge of the film is not limited; any film thickness capable of being produced by co-extrusion techniques is applicable. The total thickness of the film, for example, may be from 50 to 1000 µm, preferably from 150 to 600 µm. The total width of the film can be from 1 to 25 meters, preferably 4 to 16 meters. Individual layers of the film are preferably from 0.03 to 300 µm each, more preferably from 1 to 200 µm.

The (i) layer or layers comprising polyamide and/or ethylene vinyl alcohol may have a thickness of from 0.03 to 300 µm, preferably from 1 to 200 µm, more preferably from 2 to 100 µm.

To ensure that the film exhibits good solar properties, it will be appreciated by those skilled in the art that additives may be added to any of the layers to improve certain characteristics. This may depend on the proposed use of the film and/or geographical locus. In certain embodiments, the additives may include UV stabilisers, antioxidants, anti-dripping agents, anti-fogging agents, anti-dust agents, IR absorbers or reflectors, nucleating agents, nanocomposites, neutralisers, colour concentrates, slip agents, foaming agents, anti-statics, and speciality additives for specific applications.

In some embodiments, the UV stabilisers may include hindered amines, phosphites, benzophenones, benzotriazoles, salicylates, nickel dialkyldithiocarbamates and the like.

In some embodiments, the antioxidants include aromatic amines and substituted phenolic compounds. For example, phenyl-β-napthylamine, di-β-napthyl-p-phenylenediamine, butylated hydroxyanisole, di-tert-butyl-p-cresol and propyl gallate.

In some embodiments, the IR absorbers or reflectors include calcined clay, silica and hydrotalcite.

In some embodiments, the neutralisers include calcium carbonate, calcium stearate and zinc stearate.

In some embodiments, the slip agents include silicones, stearamide, oleamide and erucamide. The slip agent may also be employed to facilitate delamination of the polymer layers even further.

In some embodiments, the anti-dripping agents include sorbitan esters, ethoxylated sorbitan esters, glycerol esters and fatty acid esters.

In some embodiments, the anti-statics include substantially straight-chain and saturated aliphatic tertiary amines, ethoxylated or propoxylated polydiorganosiloxanes, and alkali metal alkanesulfonates.

The polymeric film according to the present disclosure is produced using known co-extrusion techniques. The film can be the result of blown co-extrusion or cast co-extrusion. In some embodiments, the greenhouse film described herein is produced using blown co-extrusion.

In the case of a co-extrusion blown film, a die is used to take two or more melt streams entering the die and distribute them to a single concentric annular melt stream as uniformly as possible to the die exit, where the film is blown. Any type of die can be used for the present disclosure, including concentric mandrel dies, conical stacked mandrel dies, modular plate designs and combined dies which combine features of any of the aforementioned die arrangements.

According to the present disclosure, the film comprising at least two layers and produced by co-extrusion technology, exhibits a layered structure in which at least two of the layers do not significantly adhere to one another. Principally, this is achieved by the relative polymeric compositions of the adjacent layers. However, it is also possible to further prevent adherence of adjacent layers by blowing air between them when the film is undergoing co-extrusion.

After the film has been blown it can be rolled and/or folded as appropriate. This means the resulting product can be easily transported as a rolled laminate structure or as a folded film of desired size. Once transported to the site of erection, the film is unrolled and/or unfolded, brought into association with the relevant greenhouse framework and fixed in place. The layers are separated on one of the sides, a flange may be fixed to one or more of the separated layers, depending on the number of layers to be delaminated, and air is blown between to layers to inflate/delaminate the film. The air can be inserted between the layers by any means known in the art, and may be achieved using a centrifugal, radial or axial fan blower. The blower may introduce the air at a pressure of less than 20 kPa, preferably less than 15 kPa, more preferably less than 5 kPa, most preferably less than 1.5 kPa. The pressure used may be greater than atmospheric pressure.

In use, the multilayered polymeric film according to the disclosure contains (i) at least one layer comprising a polyimide and/or ethylene vinyl alcohol and (ii) at least one further polymer layer, wherein at least 80% of layer (i) and layer (ii) are delaminated. In a preferable aspect at least 85% of layer (i) and layer (ii) are delaminated, more preferably at least 90%, most preferably at least 95%.

The term "inflated" when used in relation to films is used to mean that at least two layers of the film are separated over at least 50% of their interfaced area with a layer of air. "Inflated" covers films where two or more of the layers are bonded around a portion or the whole of their periphery.

The film may or may not be sealed around the periphery of the film, although in some embodiments the film is substantially unsealed around the periphery. In particular embodiments, the layers (i) and (ii) of the films of the present disclosure are bonded around less than 90% of their periphery, preferably less than 75%, preferably less than 50%, preferably less than 25%, preferably less than 10%. Bonding of the layers (i) and (ii) around their peripheries may be 0% in certain embodiments of the disclosure. As used herein, "periphery" means the outer 1- to 20 cm edge of the film.

The film as described herein may exhibit various patterns of delamination. wherein certain areas of the film are provided with characteristics that do not allow the film to delaminate. This can be achieved by chemical means, such as by using adhesives or tie-materials, or by heat or plasma treatment of the film in specific areas. Further, this can also be achieved by mechanical blocking of e.g. layer i) at certain points inside the die, thus allowing the other layers to be welded at those points during production. The film can also be affixed to the greenhouse structure in such a way that only certain areas of the film can be delaminated. The film may exhibit regular or irregular tessellations of shapes with up to six sides, or may exhibit symmetrical or asymmetrical arrangements of channels and ridges.

The width of the film can vary in the range of from 1 to 25 meters, preferably from 4 to 16 meters, and the length can vary from 10 to 3000 meters, preferably from 30 to 1000 meters. Nevertheless, it will be appreciated by those skilled in the art that the blown film may be cut into any desired size or shape as required.

The film may be provided with specified fixation points, which facilitate attachment to the agricultural structure. These can be predetermined points of the film. The fixation points, when present, include hooks for suspending the film from a structure and holes with reinforced rims (such as metal reinforced rings) through which bolts, rivets, clips or the like may pass.

The multilayered polymeric film or sheet of the present disclosure can be used in association with an agricultural structure or greenhouse. More specifically, it can be used to cover at least a portion of the agricultural structure or greenhouse. Thus, in accordance with certain embodiments of the present disclosure, there is provided an agricultural structure or greenhouse, wherein the polymeric film (in either laminated or delaminated form) described herein is attached thereto.

In certain embodiments of the disclosure, there is provided a multilayered polymeric film for covering an agricultural structure or greenhouse, wherein the film contains (i) at least one layer comprising a polyamide and/or ethylene vinyl alcohol, and (ii) at least one further polymer layer connected thereto, wherein layer (i) and layer (ii) are capable of delamination from one another, the at least one further polymer layer (ii) comprises a polymeric material selected from the group consisting of polyethylene, polypropylene, ethylene vinyl acetate copolymer, ethylene butyl acrylate copolymer, thermoplastic polyurethane, and combinations of two or more thereof, and the film has a luminous transmittance greater than 30%, and layer (i) and layer (ii) have an average delamination strength of less than 100 g/15 mm, preferably less than 75 g/15 mm, even more preferably less than 30 g/15 mm.

In another embodiment of the disclosure, there is provided a multilayered polymeric film for covering an agricultural structure or greenhouse, wherein the film contains (i) at least one layer comprising a polyamide and/or ethylene vinyl alcohol, and (ii) at least one further polymer layer connected thereto, wherein layer (i) and layer (ii) are capable of delamination from one another, the at least one further polymer layer (ii) comprises a polymeric material selected from the group consisting of polyethylene, polypropylene, ethylene vinyl acetate copolymer, ethylene butyl acrylate copolymer, thermoplastic polyurethane, and combinations of two or more thereof, and the film has a luminous transmittance greater than 30%, the polymer of layer (i) is selected from the group consisting of polyamide 6, polyamide 6/6, polyamide 6/66, polyamide 6/610, polyamide 6/6T, polyamide 6/3T, polyamide 6T, polyamide 9T, polyamide 4/6, polyamide 11, polyamide 12, polyamide 6/10, polyamide 6/69, polyamide 66/610 polyamide 6/12, polyamide 5/10, polyamide 6I, polyamide nanocomposites, ethylene vinyl alcohol and combinations of two or more thereof, and layer (i) and layer (ii) have an average delamination strength of less than 100 g/15 mm, preferably less than 75 g/15 mm, even more preferably less than 30 g/15 mm.

In another embodiment of the disclosure, there is provided a multilayered polymeric film for covering an agricultural structure or greenhouse, wherein the film contains (i) at least one layer comprising a polyamide and/or ethylene vinyl alcohol and (ii) at least one further polymer layer connected thereto, wherein the polymer of layer (i) is selected from the group consisting of polyamide 6, polyamide 6/6, polyamide 6/66, polyamide 6/610. polyamide 6/6T, polyamide 6/3T, polyamide 6T, polyamide 9T, polyamide 4/6, polyamide 11, polyamide 12, polyamide 6/10, polyamide 6/69, polyamide 66/610 polyamide 6/12, polyamide 5/10, polyamide 6I, polyamide nanocomposites, ethylene vinyl alcohol and combinations of two or more thereof, layer (ii) comprises a polymeric material selected from the group consisting of polyethylene, polypropylene, ethylene vinyl acetate copolymer, ethylene butyl acrylate copolymer, thermoplastic polyurethane, other materials suitable for greenhouse applications and combinations of two or more thereof, the film has a luminous transmittance greater than 30%, and layer (i) and layer (ii) have an average delamination strength of less than 100 g/15 mm, preferably less than 75 g/15 mm, even more preferably less than 30 g/15 mm.

In another embodiment of the disclosure, there is provided a multilayered polymeric film for covering an agricultural structure or greenhouse, wherein the film contains (i) at least one layer comprising a polyamide and/or ethylene vinyl alcohol and (ii) at least one further polymer layer connected thereto, wherein the polymer of layer (i) is selected from the group consisting of polyamide 6, polyamide 6/6, polyamide 6/66, polyamide 6/610, polyamide 6/6T, polyamide 6/3T, polyamide 6T, polyamide 9T, polyamide 4/6, polyamide 11, polyamide 12, polyamide 6/10, polyamide 6/69, polyamide 66/610 polyamide 6/12, polyamide 5/10, polyamide 6I, polyamide nanocomposites, ethylene vinyl alcohol and combinations of two or more thereof, layer (ii) comprises a polymeric material selected from the group consisting of polyethylene, polypropylene, ethylene vinyl acetate copolymer, ethylene butyl acrylate copolymer, thermoplastic polyurethane, other materials suitable for greenhouse applications and combinations of two or more thereof, the film has a luminous transmittance greater than 30%, layer (i) and layer (ii) have an average delamination strength of less than 100 g/15 mm, preferably less than 75 g/15 mm, even more preferably less than 30 g/15 mm and the total thickness of the film is from 50 to 1000 µm, preferably from 150 to 600 µm and that the total width of the film is from 1 to 30 metres.

In yet another embodiment of the disclosure, there is provided a multilayered polymeric film for covering an agricultural structure or greenhouse, wherein the film contains (i) at least one layer comprising a polyamide and/or ethylene vinyl alcohol and (ii) at least one further polymer layer connected thereto, wherein the polymer of layer (i) is selected from the group consisting of polyamide 6, polyamide 6/6, polyamide 6/66, polyamide 6/610, polyamide 6/6T, polyamide 6/3T, polyamide 6T, polyamide 9T, polyamide 4/6, polyamide 11, polyamide 12, polyamide 6/10, polyamide 6/69, polyamide 66/610 polyamide 6/12, polyamide 5/10, polyamide 6I, polyamide nanocomposites, ethylene vinyl alcohol and combinations of two or more thereof, layer (ii) comprises a polymeric material selected from the group consisting of polyethylene, polypropylene, ethylene vinyl acetate copolymer, ethylene butyl acrylate copolymer, thermoplastic polyurethane, other materials suitable for greenhouse applications and combinations of two or more thereof, the film has a luminous transmittance greater than 30%, the film further comprises chemical or mineral additives selected from the group consisting of UV stabilisers, antioxidants, anti-dripping agents, anti-fogging agents, anti-dust agents, IR absorbers, nucleating agents, slip agents, nanocomposites and combinations of two or more thereof, and layer (i) and layer (ii) have an average delamination strength of less than 100 g/15 mm, preferably less than 75 g/15 mm, even more preferably less than 30 g/15 mm.

In another embodiment of the disclosure, there is provided a multilayered polymeric film for covering an agricultural structure or greenhouse, wherein the film or sheet comprises at least one layer comprising polyethylene from 100 to 200 µm thick, at least one layer of a polyamide and/or ethylene vinyl alcohol from 5 to 50 µm thick and at least one layer of ethylene butyl acrylate copolymer from 100 to 150 µm thick, wherein the polymer of layer (i) is selected from the group consisting of polyamide 6, polyamide 6/6, polyamide 6/66, polyamide 6/610, polyamide 6/6T, polyamide 6/3T, polyamide 6T, polyamide 9T, polyamide 4/6, polyamide 11, polyamide 12, polyamide 6/10, polyamide 6/69, polyamide 66/610 polyamide 6/12, polyamide 5/10, polyamide 6I, polyamide nanocomposites, ethylene vinyl alcohol and combinations of two or more thereof, and at least one of the layers connected to the polyamide and/or ethylene vinyl alcohol layer is capable of being delaminated, having an average delamination strength of less than 100 g/15 mm, preferably less than 75 g/15 mm, even more preferably less than 30 g/15 mm, and the film has a luminous transmittance greater than 30%. In this embodiment the film is capable of having one or more layers of air separating the polymer layers.

In another embodiment of the disclosure, there is provided a multilayered polymeric film for covering an agricultural structure or greenhouse, wherein the film or sheet comprises at least one layer comprising polyethylene from 100 to 200 µm thick, at least one layer of a polyamide and/or ethylene vinyl alcohol from 5 to 200 µm thick and at least one layer of ethylene butyl acrylate copolymer from 100 to 200 μm thick, wherein the polymer of layer (i) is selected from the group consisting of polyamide 6, polyamide 6/6, polyamide 6/66, polyamide 6/610, polyamide 6/6T, polyamide 6/3T, polyamide 6T, polyamide 9T, polyamide 4/6, polyamide 11, polyamide 12, polyamide 6/10, polyamide 6/69, polyamide 66/610 polyamide 6/12, polyamide 5/10, polyamide 6I, polyamide nanocomposites, ethylene vinyl alcohol and combinations of two or more thereof, and at least two of the layers connected to the polyamide and/or ethylene vinyl alcohol layer are capable of being delaminated, each having an average delamination strength of less than 100 g/15 mm, preferably less than 75 g/15 mm, even more preferably less than 30 g/15 mm, and the film has a luminous transmittance greater than 30%. In this embodiment the film is capable of having two or more layers of air separating the polymer layers.

In another embodiment of the disclosure, there is provided a multilayered polymeric film for covering an agricultural structure or greenhouse, wherein the film contains (i) at least one layer comprising a polyamide and/or ethylene vinyl alcohol, and (ii) at least one further polymer layer, wherein at least 80% of the initial (laminated) interface of layer (i) and layer (ii) are delaminated, preferably at least 90%, even more preferably at least 95%, the at least one further polymer layer (ii) comprises a polymeric material selected from the group consisting of polyethylene, polypropylene, ethylene vinyl acetate copolymer, ethylene butyl acrylate copolymer, thermoplastic polyurethane, and combinations of two or more thereof, and the film has a luminous transmittance greater than 30%.

In another embodiment of the disclosure, there is provided a multilayered polymeric film for covering an agricultural structure or greenhouse, wherein the film contains (i) at least one layer comprising a polyamide and/or ethylene vinyl alcohol, and (ii) at least one further polymer layer, wherein at least 80% of the initial (laminated) interface of layer (i) and layer (ii) are delaminated, preferably at least 90%. even more preferably at least 95%, the at least one further polymer layer (ii) comprises a polymeric material selected from the group consisting of polyethylene, polypropylene, ethylene vinyl acetate copolymer, ethylene butyl acrylate copolymer, thermoplastic polyurethane, and combinations of two or more thereof, the film has a luminous transmittance greater than 30%, and layer (i) and layer (ii) have an average delamination strength of less than 100 g/15 mm, preferably less than 75 g/15 mm, even more preferably less than 30 g/15 mm.

In another embodiment of the disclosure, there is provided a multilayered polymeric film for covering an agricultural structure or greenhouse, wherein the film contains (i) at least one layer comprising a polyamide and/or ethylene vinyl alcohol, and (ii) at least one further polymer layer, wherein at least 80% of the initial (laminated) interface of layer (i) and layer (ii) are delaminated, preferably at least 90%, even more preferably at least 95%, the at least one further polymer layer (ii) comprises a polymeric material selected from the group consisting of polyethylene, polypropylene, ethylene vinyl acetate copolymer, ethylene butyl acrylate copolymer, thermoplastic polyurethane, and combinations of two or more thereof, the film has a luminous transmittance greater than 30%, and the polymer of layer (i) is selected from the group consisting of polyamide 6, polyamide 6/6, polyamide 6/66, polyamide 6/610, polyamide 6/6T, polyamide 6/3T, polyamide 6T, polyamide 9T, polyamide 4/6, polyamide 11, polyamide 12, polyamide 6/10, polyamide 6/69, polyamide 66/610 polyamide 6/12, polyamide 5/10, polyamide 6I, polyamide nanocomposites, ethylene vinyl alcohol and combinations of two or more thereof.

In another embodiment of the disclosure, there is provided a multilayered polymeric film for covering an agricultural structure or greenhouse, wherein the film contains (i) at least one layer comprising a polyamide and/or ethylene vinyl alcohol and (ii) at least one further polymer layer, wherein at least 90% of the initial (laminated) interface of layer (i) and layer (ii) are delaminated, preferably at least 95%, the polymer of layer (i) is selected from the group consisting of polyamide 6, polyamide 6/6, polyamide 6/66, polyamide 6/610, polyamide 6/6T, polyamide 6/3T, polyamide 6T, polyamide 9T, polyamide 4/6, polyamide 11, polyamide 12, polyamide 6/10, polyamide 6/69, polyamide 66/610 polyamide 6/12, polyamide 5/10, polyamide 6I, polyamide nanocomposites, ethylene vinyl alcohol and combinations of two or more thereof, layer (ii) comprises a polymeric material selected from the group consisting of polyethylene, polypropylene, ethylene vinyl acetate copolymer, ethylene butyl acrylate copolymer, thermoplastic polyurethane, other materials suitable for greenhouse applications and combinations of two or more thereof, and the film has a luminous transmittance greater than 30%.

In another embodiment of the disclosure, there is provided a multilayered polymeric film for covering an agricultural structure or greenhouse, wherein the film contains (i) at least one layer comprising a polyamide and/or ethylene vinyl alcohol and (ii) at least one further polymer layer, wherein at least 90% of the initial (laminated) interface of layer (i) and layer (ii) are delaminated, preferably at least 95%, the polymer of layer (i) is selected from the group consisting of polyamide 6, polyamide 6/6, polyamide 6/66, polyamide 6/610, polyamide 6/6T, polyamide 6/3T, polyamide 6T, polyamide 9T, polyamide 4/6, polyamide 11, polyamide 12, polyamide 6/10, polyamide 6/69, polyamide 66/610 polyamide 6/12, polyamide 5/10, polyamide 6I, polyamide nanocomposites, ethylene vinyl alcohol and combinations of two or more thereof, layer (ii) comprises a polymeric material selected from the group consisting of polyethylene, polypropylene, ethylene vinyl acetate copolymer, ethylene butyl acrylate copolymer, thermoplastic polyurethane, other materials suitable for greenhouse applications and combinations of two or more thereof, the film has a luminous transmittance greater than 30%. and the film further comprises chemical or mineral additives selected from the group consisting of UV stabilisers, antioxidants, anti-dripping agents, anti-fogging agents, anti-dust agents, IR absorbers, nucleating agents, anti-slip agents, nanocomposites and combinations of two or more thereof.

In another embodiment of the disclosure, there is provided a multilayered polymeric film for covering an agricultural structure or greenhouse, wherein the film or sheet comprises at least one layer comprising polyethylene from 100 to 200 μm thick, at least one layer of a polyamide and/or ethylene vinyl alcohol from 5 to 50 μm thick and at least one layer of ethylene butyl acrylate copolymer from 100 to 150 μm thick, wherein the polymer of layer (i) is selected from the group consisting of polyamide 6, polyamide 6/6, polyamide 6/66, polyamide 6/610, polyamide 6/6T, polyamide 6/3T, polyamide 6T, polyamide 9T, polyamide 4/6, polyamide 11, polyamide 12, polyamide 6/10, polyamide 6/69, polyamide 66/610 polyamide 6/12, polyamide 5/10, polyamide 6I, polyamide nanocomposites, ethylene vinyl alcohol and combinations of two or more thereof, the polyamide and/or ethylene vinyl alcohol layer and at least one of the layers connected thereto is at least 90% delaminated, preferably at least 95%, and the film has a luminous transmittance greater than 30%. in this embodiment the film is capable of having one or more layers of air separating the polymer layers.

In another embodiment of the disclosure, there is provided a multilayered polymeric film for covering an agricultural structure or greenhouse, wherein the film or sheet comprises at least one layer comprising polyethylene from 100 to 200 μm thick, at least one layer of a polyamide and/or ethylene vinyl alcohol from 5 to 200 μm thick and at least one layer of ethylene butyl acrylate copolymer from 100 to 200 μm thick, wherein the polymer of layer (i) is selected from the group consisting of polyamide 6, polyamide 6/6, polyamide 6/66, polyamide 6/610, polyamide 6/6T, polyamide 6/3T, polyamide 6T, polyamide 9T, polyamide 4/6, polyamide 11, polyamide 12, polyamide 6/10, polyamide 6/69, polyamide 66/610 polyamide 6/12, polyamide 5/10, polyamide 6I, polyamide nanocomposites, ethylene vinyl alcohol and combinations of two or more thereof, the polyamide and/or ethylene vinyl alcohol layer and at least two of the layers connected thereto are at least 90% delaminated, preferably at least 95%, and the film has a luminous transmittance greater than 30%. In this embodiment the film is capable of having two or more layers of air separating the polymer layers.

In certain methods of the disclosure, there is provided a method of covering an agricultural structure or greenhouse with the polymeric film comprising the step of inserting air between the (i) at least one layer comprising the polyamide and/or ethylene vinyl alcohol and the (ii) at least one further polymer layer, wherein the film contains (i) at least one layer comprising a polyamide and/or ethylene vinyl alcohol and (ii) at least one further polymer layer connected thereto and wherein the polymer of layer (i) is selected from the group consisting of polyamide 6, polyamide 6/6, polyamide 6/66, polyamide 6/610, polyamide 6/6T, polyamide 6/3T, polyamide 6T, polyamide 9T, polyamide 4/6, polyamide 11, polyamide 12, polyamide 6/10, polyamide 6/69, polyamide 66/610 polyamide 6/12, polyamide 5/10, polyamide 6I, polyamide nanocomposites, ethylene vinyl alcohol and combinations of two or more thereof, layer (ii) comprises a polymeric material selected from the group consisting of polyethylene, polypropylene, ethylene vinyl acetate copolymer, ethylene butyl acrylate copolymer, thermoplastic polyurethane, other materials suitable for greenhouse applications and combinations of two or more thereof, layer (i) and layer (ii) have an average delamination strength of less than 100 g/15 mm, preferably less than 75 g/15 mm, even more preferably less than 30 g/15 mm, the film has a luminous transmittance greater than 30%, and the total thickness of the film or sheet is from 50 to 1000 μm, preferably from 150 to 600 μm and that the total width of the film is from 1 to 30 metres.

In a final aspect of the present disclosure, there is provided an alternative use of the multilayered polymeric film as a container liner for packaging applications. In this aspect, the film may be delaminated and inflated with gas to provide a multilayered liner in which the layered structure ensures the packaging is not penetrated and contents spoiled. The insertion of gas between the layers further provides cushioning for any stresses the package may undergo, for example in transit to the marketplace.

The disclosure of separate embodiments and features is not intended to be limiting. Separately disclosed embodiments, aspects and features may be read together in combination and recited features may be interchangeable.

EXAMPLES

Examples of multilayered polymeric film structures that can be employed in accordance with the disclosure are shown below.

Example 1

In this example of a multilayered polymeric film structure, layer A is capable of being delaminated from layer B by the insertion of air.

A: Polyethylene (150-200 μm)
B: Polyamide (150-200 μm)

Example 2

In these examples of multilayered polymeric film structures, layer C is capable of being delaminated from layers A and B which remain bonded together.

2a)

A: Polyethylene + 10-20% tie-material (140-190 μm)
B: Polyamide (5-10 μm)
C: Ethylene butyl acrylate (150-200 μm)

2b)

A: Polyethylene + 10-20% tie-material (140-170 μm)
B: Polyamide (5-30 μm)
C: Ethylene butyl acrylate (150-200 μm)

Example 3

In these examples of multilayered polymeric film structures, layers D and E remain bonded together and are capable of being delaminated from layers A, B and C which remain bonded together.

3a)

A: Polyethylene (130-190 μm)
B: Polyethylene + 10-20% tie-material (5-10 μm)
C: Polyamide (5-10 μm)
D: Ethylene butyl acrylate (50-100 μm)
E: Polyethylene (100-150 μm)

3b)

A: Polyethylene (130-190 μm)
B: Polyethylene + 10-20% tie-material (5-10 μm)
C: Ethylene vinyl alcohol (5-10 μm)
D: Ethylene butyl acrylate (50-100 μm)
E: Polyethylene (100-150 μm)

3c)

A: Polyethylene (130-160 μm)
B: Polyethylene + 10-20% tie-material (5-20 μm)
C: Polyamide (5-30 μm)
D: Ethylene butyl acrylate (50-100 μm)
E: Polyethylene (100-150 μm)

Example 4

In this example of a multilayered polymeric film structure, layer A is capable of being delaminated from layer B and layer B is capable of being delaminated from layer C. This allows for multiple layers of air to be inserted between delaminated layers for even better thermal insulation properties.

---
A: Polyethylene (100-200 μm)
B: Polyamide (20-200 μm)
C: Ethylene butyl acrylate (100-200 μm)
---

In the same way it is possible to create an inflated multilayered polymeric film with 4, 5 or even more layers having air between them.

The disclosed structures are indicative as to the kind of materials per layer, the number and thickness of the layers and of the whole polymeric film. Each of the layers can contain blends of different materials as well as different chemical or mineral additives, such as UV stabilizers, antioxidants, anti-dripping agents, anti-fogging agents, anti-dust agents, IR absorbers or reflectors, nucleating agents, nanocomposites, neutralisers, colour concentrates, slip agents, anti-statics, and speciality additives for specific applications.

The invention claimed is:

1. A method of covering an agricultural structure or greenhouse with a multilayered polymeric film, wherein the film contains (i) at least one layer comprising a polymer selected from a polyamide and ethylene vinyl alcohol, and (ii) at least one further polymer layer connected thereto, wherein the (i) at least one layer and the (ii) at least one further polymer layer have an average delamination strength of less than 250 g/15 mm when measured using ASTM D-1876, the (ii) at least one further polymer layer comprises a polymeric material selected from the group consisting of polyethylene, polypropylene, ethylene vinyl acetate copolymer, ethylene butyl acrylate copolymer, thermoplastic polyurethane, and combinations of two or more thereof, and the film has a luminous transmittance greater than 30%, wherein the method comprises the step of inserting gas between the (i) at least one layer comprising the polymer selected from a polyamide and ethylene vinyl alcohol, and the (ii) at least one further polymer layer to delaminate the (i) at least one layer and the (ii) at least one further layer and create a layer of the gas between said layers so that the multilayered polymeric film is inflated when in use, wherein the multilayered polymeric film is co-extruded.

2. The method according to claim 1, wherein at least 80% of the (i) at least one layer and the (ii) at least one further polymer layer are delaminated from one another.

3. The method according to claim 1, wherein the (i) at least one layer and the (ii) at least one further polymer layer have an average delamination strength of less than 100 g/15 mm.

4. The method according to claim 1, wherein the (i) at least one layer contains greater than 20 wt % of the polymer selected from a polyamide and ethylene vinyl alcohol.

5. The method according to claim 1, wherein the polymer of the (i) at least one layer is selected from the group consisting of polyamide 6, polyamide 6/6, polyamide 6/66, polyamide 6/610, polyamide 6/6T, polyamide 6/3T, polyamide 6T, polyamide 9T, polyamide 4/6, polyamide 11, polyamide 12, polyamide 6/10, polyamide 6/69, polyamide 66/610, polyamide 6/12, polyamide 5/10, polyamide 6I, polyamide nanocomposites, and ethylene vinyl alcohol.

6. The method according to claim 1, wherein the (ii) at least one further polymer layer contains greater than 10 wt % of the polymeric material.

7. The method according to claim 1, wherein the (i) at least one layer has a thickness of from 0.03 to 300 μm, the film has a total thickness of from 50 to 1000 μm, and a total width of from 1 to 25 meters.

8. The method according to claim 7, wherein the (i) at least one layer further comprises polyvinyl alcohol.

9. The method according to claim 1, wherein the film further comprises from 1 to 20 additional layers.

10. The method according to claim 1, wherein the film further comprises chemical or mineral additives selected from the group consisting of UV stabilisers, antioxidants, anti-dripping agents, anti-fogging agents, anti-dust agents, IR absorbers, nucleating agents, slip agents, foaming agents, nanocomposites and combinations of two or more thereof.

11. The method according to claim 1, wherein the film is obtainable by blown or cast co-extrusion.

12. The method according to claim 1, comprising covering at least a portion of the agricultural structure or greenhouse with the film.

13. The method of covering an agricultural structure or greenhouse according to claim 1, wherein the gas is inserted between the (i) at least one layer and the (ii) at least one further polymer layer at a pressure of less than 20 kPa.

14. The method according to claim 13, wherein the gas is atmospheric air.

15. The method according to claim 13, wherein the pressure is less than 15 kPa.

16. A method of covering an agricultural structure or greenhouse with a multilayered polymeric film, wherein the film contains (i) at least one layer comprising a polymer selected from a polyamide and ethylene vinyl alcohol, and (ii) at least one further polymer layer, wherein at least 50% of the (i) at least one layer and the (ii) at least one further polymer layer are able to be delaminated, the (ii) at least one further polymer layer comprises a polymeric material selected from the group consisting of polyethylene, polypropylene, ethylene vinyl acetate copolymer, ethylene butyl acrylate copolymer, thermoplastic polyurethane and combinations of two or more thereof, and the film has a luminous transmittance greater than 30%, wherein the method comprises the step of inserting gas between the (i) at least one layer comprising the polymer selected from a polyamide and ethylene vinyl alcohol, and the (ii) at least one further polymer layer to delaminate the (i) at least one layer and the (ii) at least one further layer and create a layer of the gas between said layers so that the multilayered polymeric film is inflated when in use, wherein the multilayered polymeric film is co-extruded.

17. The method according to claim 16, wherein at least 80% of the (i) at least one layer and the (ii) at least one further polymer layer are delaminated from one another.

18. The method according to claim 16, wherein the (i) at least one layer and the (ii) at least one further polymer layer have an average delamination strength of less than 100 g/15 mm.

19. The method according to claim 16, wherein the (i) at least one layer contains greater than 20 wt % of the polymer selected from a polyamide and ethylene vinyl alcohol.

20. The method according to claim 16, wherein the polymer of the (i) at least one layer is selected from the group consisting of polyamide 6, polyamide 6/6, polyamide 6/66, polyamide 6/610, polyamide 6/6T, polyamide 6/3T, polyamide 6T, polyamide 9T, polyamide 4/6, polyamide 11, polyamide 12, polyamide 6/10, polyamide 6/69, polyamide 66/610, polyamide 6/12, polyamide 5/10, polyamide 6I, polyamide nanocomposites, and ethylene vinyl alcohol.

21. The method according to claim 16, wherein the (ii) at least one further polymer layer contains greater than 10 wt % of the polymeric material.

22. The method according to claim 16, wherein the (i) at least one layer has a thickness of from 0.03 to 300 μm, the film has a total thickness of from 50 to 1000 μm and a total width of from 1 to 25 meters.

23. The method according to claim 22, wherein the (i) at least one layer further comprises polyvinyl alcohol.

24. The method according to claim 16, wherein the film further comprises from 1 to 20 additional layers.

25. The method according to claim 16, wherein the film further comprises chemical or mineral additives selected from the group consisting of UV stabilisers, antioxidants, anti-dripping agents, anti-fogging agents, anti-dust agents, IR absorbers, nucleating agents, slip agents, foaming agents, nanocomposites and combinations of two or more thereof.

26. The method according to claim 16, wherein the film is obtainable by blown or cast co-extrusion.

27. The method according to claim 16, comprising covering at least a portion of the agricultural structure or greenhouse with the film.

28. The method of covering an agricultural structure or greenhouse according to claim 16, wherein the gas is inserted between the (i) at least one layer and the (ii) at least one further polymer layer at a pressure of less than 20 kPa.

29. The method according to claim 28, wherein the gas is atmospheric air.

30. The method according to claim 28, wherein the pressure is less than 15 kPa.

* * * * *